United States Patent
Wagner et al.

(10) Patent No.: US 6,898,928 B2
(45) Date of Patent: May 31, 2005

(54) CO-ORDINATION OF DIFFERENT REQUIREMENTS OF THE EXHAUST GAS TEMPERATURE AND CORRESPONDING HEATING AND COOLING MEASURES

(75) Inventors: Jens Wagner, Stuttgart (DE); Andreas Koring, Ludwigsburg (DE); Ralf Daeubel, Markgroeningen (DE); Beate Rittmann, Markgroeningen (DE); Klaus Winkler, Rutesheim (DE)

(73) Assignee: Robert Bosch GmbH, Stuttgart (DE)

( * ) Notice: Subject to any disclaimer, the term of this patent is extended or adjusted under 35 U.S.C. 154(b) by 253 days.

(21) Appl. No.: 10/129,397

(22) PCT Filed: Aug. 30, 2001

(86) PCT No.: PCT/DE01/03231
§ 371 (c)(1),
(2), (4) Date: Aug. 6, 2002

(87) PCT Pub. No.: WO02/20965
PCT Pub. Date: Mar. 14, 2002

(65) Prior Publication Data
US 2003/0074889 A1 Apr. 24, 2003

(30) Foreign Application Priority Data
Sep. 4, 2000  (DE) .......................................... 100 43 687

(51) Int. Cl.$^7$ .............................................. F01N 3/00
(52) U.S. Cl. ............................ 60/285; 60/274; 60/298; 60/300
(58) Field of Search .......................... 60/274, 276, 285, 60/286, 298, 300

(56) References Cited

U.S. PATENT DOCUMENTS

| 5,590,521 A | | 1/1997 | Schnaibel et al. | |
|---|---|---|---|---|
| 5,722,236 A | * | 3/1998 | Cullen et al. | 60/274 |
| 5,746,049 A | * | 5/1998 | Cullen et al. | 60/274 |
| 5,771,690 A | | 6/1998 | Kakizaki et al. | |
| 5,855,113 A | * | 1/1999 | Cullen et al. | 60/274 |
| 5,974,788 A | * | 11/1999 | Hepburn et al. | 60/285 |
| 5,983,627 A | * | 11/1999 | Asik | 60/276 |
| 6,141,960 A | * | 11/2000 | Takami et al. | 60/286 |
| 6,237,330 B1 | * | 5/2001 | Takahashi et al. | 60/285 |
| 6,269,634 B1 | * | 8/2001 | Yokota et al. | 60/286 |

FOREIGN PATENT DOCUMENTS

| DE | 197 52 274 | 5/1999 |
|---|---|---|
| DE | 198 51 990 | 6/2000 |
| EP | 0 896 142 | 2/1999 |

\* cited by examiner

Primary Examiner—Thomas Denion
Assistant Examiner—Tu M. Nguyen
(74) Attorney, Agent, or Firm—Kenyon & Kenyon

(57) ABSTRACT

A method for influencing the exhaust gas temperature of an internal combustion engine is described in which measures can be carried out for increasing, lowering and limiting exhaust gas temperature. Depending on temperature requirements, and in which method these temperature requirements are prioritized, the temperature limitation having the highest priority for ensuring protection of the component parts, the resulting temperature requirement may be achieved by heating measures or cooling measures in such a way that heating measures and cooling measures are not applied at the same time.

7 Claims, 2 Drawing Sheets

CO-ORDINATION OF DIFFERENT REQUIREMENTS OF THE EXHAUST GAS TEMPERATURE AND CORRESPONDING HEATING AND COOLING MEASURES

FIELD OF THE INVENTION

The present invention relates to internal combustion, and in particular relates to a method for influencing the exhaust gas temperature of an internal combustion engine.

BACKGROUND INFORMATION

In vehicles having an internal combustion engine, the exhaust gas temperature is generally held within definite temperature ranges for several reasons: to avoid thermal overload of the component parts in the exhaust gas system; to reach or maintain the operating temperature (lightoff) of catalytic converters in the exhaust branch; and possibly also to bring an NOx-storing catalyst to a high temperature so as to discharge stored sulfur.

In order to heat up catalytic converters in the exhaust branch, the ignition firing point is often delayed. For this reason, combustion does not proceed optimally. For equal torque produced, exhaust gas temperatures are then higher.

Thermal overload of the component parts in the exhaust gas system is usually prevented by the following interventions:

The most retarded ignition angle is limited as a function of the operating point of the engine. For the purpose of engine heating of the catalytic converter, or on account of a torque aiming-off allowance for rapid controller interventions, the ignition angle may lie more retarded in time than the optimum ignition angle for maximum torque and power efficiency.

For a short-time retarding of ignition, the combustion limit is a deciding factor. For continuing retarded ignition, the maximum ignition angle allowable is the angle at which critical temperatures have not yet been reached in the exhaust manifold. This retard limit is ascertained on the basis of an operating state of the engine. In this connection, the operating state is defined, for instance, by values for air charge, engine output and engine speed.

This intervention is relevant particularly for the partial throttle range. It may be seen as a passive restriction for the protection of component parts.

A further possibility for intervention to prevent thermal overload is to enrich the mixture as a function of modeled or measured temperatures in the exhaust gas system.

If the modeled/measured temperatures in the exhaust gas system exceed critical limits, rich engine operation is employed.

The exhaust gas is cooled by the enthalpy of vaporization of the excess fuel. This intervention is relevant particularly for operating points near full throttle. It may be viewed as an active intervention.

For a heating phase directly following start-up, limitation of the ignition angles is sufficient protection of component parts since the exhaust tract is still cold. Because of that, thermal damage can also be discounted even when the exhaust gas temperatures are excessively high for a short time period. In the case of engines in lean-combustion operation having an NOx-storing catalyst (e.g. engines having direct fuel injection), the NOx-storing catalyst is cyclically desulfurized. For this, the NOx-storing catalyst is heated to temperatures above 600° C. during operation. In this connection, critical temperatures in the exhaust branch may be reached in the partial throttle range.

Alternatively, a leaner engine operation typically requires the NOx-storing catalyst to be within a temperature range of 200° C.–450° C. The exhaust gas system is normally designed so that these temperatures are ensured over a wide operating range. Therefore, measures for cooling the exhaust gas may be necessary. The most simple variant is to let the exhaust branch have travel air flowing over it to increase the heat loss by convection.

For a heating phase directly following start-up, limitation of the ignition angles is sufficient protection for component parts because the exhaust tract is still cold. Because of that, thermal damage can also be discounted in case the exhaust gas temperatures are too high for a short period. For the desulfurization of an NOx-storing catalyst, the latter is heated to temperatures above 600° C. during normal engine operation. In this case, critical temperatures in the exhaust branch may be reached, especially in the part throttle range. This problem can become more stringent on account of the cooling measures for the NOx-storing catalyst described above. Component parts positioned upstream of the catalytic converter can then approach near their critical temperature.

Conventionally, interventions for component part protection which have the purpose of limiting exhaust gas temperatures, and interventions for heating up the catalytic converters which have the purpose of raising exhaust gas temperatures, have been performed independently of one another.

This may be problematic, because heating measures may affect measures for exhaust gas cooling. If, for example, because of retarded ignition angles, the air-fuel mixture is enriched, an inefficiency arises if the critical temperatures are not attained because of the limitation on the ignition angles. In addition, emissions may be worsened.

In order to maintain operating temperatures of the NOx-storing catalyst over wide operating ranges, further active exhaust gas cooling measures may be applied such as controllable incident flow to the exhaust branch via damper, and rerouting of the exhaust gas via heat exchanger. These cooling measures may make enrichment unnecessary.

SUMMARY

An object of the present invention is to avoid inefficiencies caused by exhaust gas heating measures and exhaust gas cooling measures.

In an internal combustion engine in which measures for increasing, decreasing and/or limiting exhaust gas temperature can each be performed, these measures are prioritized depending on temperature requirements. Component part protection is given highest priority. The resulting temperature requirements are implemented by heating measures or cooling measures in such a way that heating measures and cooling measures are not applied at the same time.

A further embodiment of the present invention provides that a temperature requirement for desulfurizing a catalytic converter is given a higher priority than a temperature requirement for the normal operation of the catalytic converter.

In another embodiment, an ignition retard of the ignition is used as a heating measure, the most retarded ignition angle being limited as a function of the operating point of the engine.

According to another embodiment, the operating state is defined at least by values for the air charge, engine speed and/or engine output.

In a still further embodiment, the mixture is enriched as a function of modeled or measured temperatures in the exhaust gas system as a cooling measure.

Within the framework of the present invention, the exhaust gas temperature and/or the temperature of a catalytic converter may be measured or modeled from operating values of the engine.

The present invention also relates to an electronic control device for implementing the methods in accordance with the specific embodiments mentioned.

According to embodiments of the present invention, different temperature requirements are coordinated. In this regard, temperature requirements may arise, for example, from the following reasons:

Requirement for temperature increase for desulfurizing the NOx-storing catalyst, Requirement for temperature limitation for component part protection, Requirement for temperature increase for the operation of a three-way catalytic converter, Requirement for temperature increase or temperature limitation for operating an NOx-storing catalyst.

These temperature requirements are prioritized as follows, according to the present invention: The temperature limitation may always be guaranteed for the protection of component parts. On the other hand, temperature requirements for operating the NOx-storing catalyst are not relevant if the latter has to be desulfurized, or if lean-combustion operation is not required.

The resulting temperature requirement is then achieved by heating measures or cooling measures.

It is also ensured by coordination that heating measures and cooling measures are not applied at the same time.

DETAILED DESCRIPTION

Figure 1:
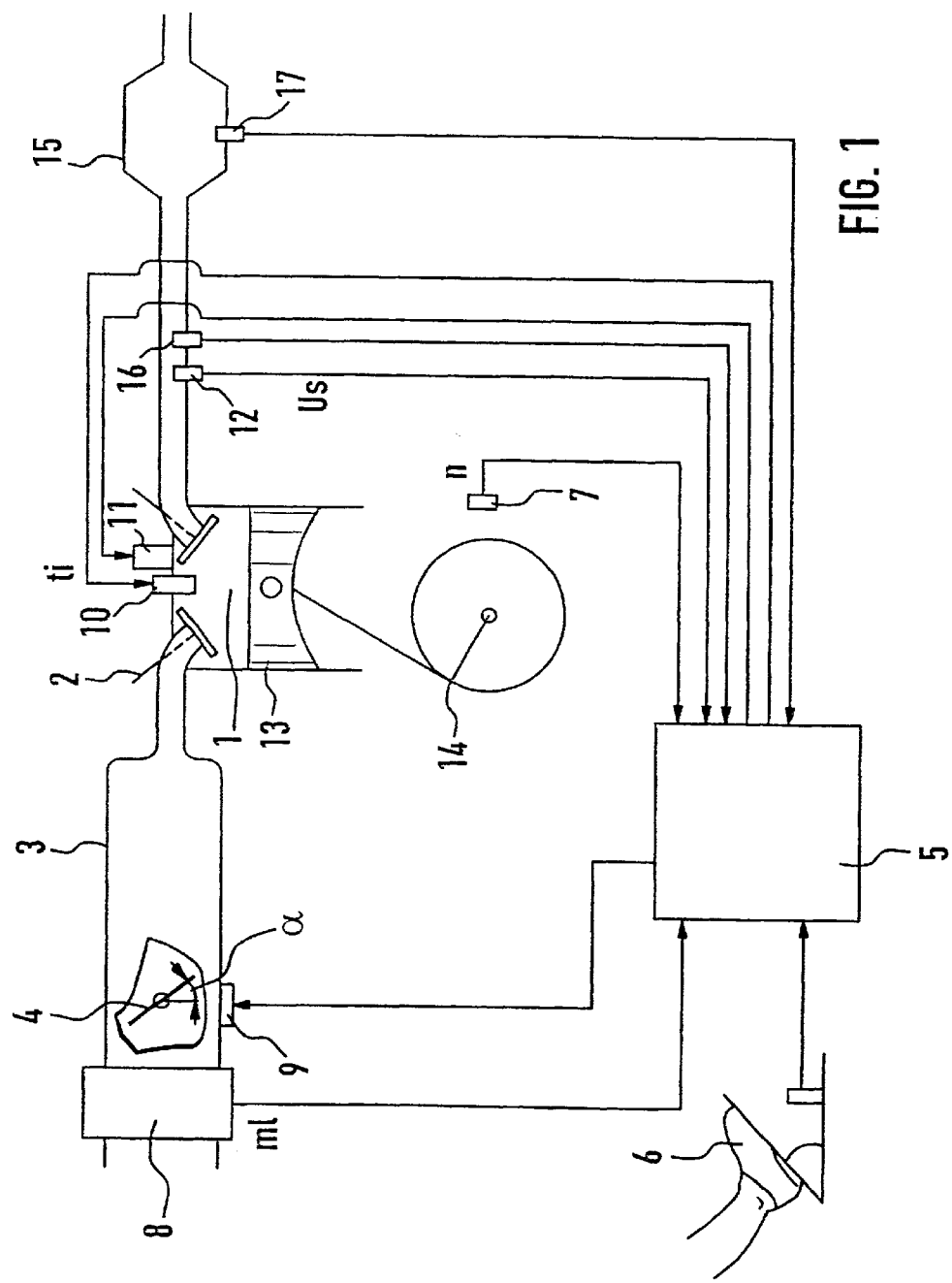
FIG. 1 is a schematic illustration of an exemplary internal combustion engine and exhaust system.

In FIG. 1, numeral '1' represents the combustion chamber of a cylinder of an internal combustion engine. The flow of air into the combustion chamber is controlled via intake valve 2. The air is drawn in via an intake manifold 3. The intake-air quantity may be varied using a throttle valve 4, which is controlled by control device 5. Signals regarding the torque desired by the driver, such as the position of an accelerator 6, a signal regarding the rotational engine speed h of a speed sensor 7 and a signal regarding the quantity ml of the drawn-in air are supplied by an air-flow sensor 8, and a signal Us regarding exhaust gas composition and/or exhaust gas temperature supplied by an exhaust-gas sensor 12, are supplied to the control device. Exhaust-gas sensor 12 can be, for instance, a lambda probe, whose Nernst voltage indicates the oxygen content of the exhaust gas and whose internal resistance can be used as a measure of the probe temperature, exhaust gas and/or catalytic converter temperature. The exhaust gas is conveyed through at least one catalytic converter 15, in which pollutants in the exhaust gas are converted and/or stored temporarily.

From these and possibly other input signals regarding further parameters of the internal combustion engine, such as intake air and coolant temperature and others, control device 5 generates output signals for adjusting throttle-valve angle alpha by an actuator 9, and for controlling a fuel injector 10, which dispenses the fuel into the combustion chamber of the engine. In addition, the control unit controls the triggering of the ignition via an ignition device 11.

The throttle-valve angle alpha and the injection-pulse width ti are adjusted in relation to each other to achieving the desired torque, exhaust gas composition and exhaust gas temperature. An additional controlled variable is the angular position of the ignition relative to piston travel. Determining the controlled variables for adjustment of the torque is described in German Patent Application No. 1 98 51 990, for example.

The control device also controls further functions for achieving an efficient combustion of the fuel/air mixture in the combustion chamber, for instance, exhaust-gas recirculation and/or tank ventilation, not shown. The gas force resulting from the combustion is converted by piston 13 and crank operation 14 into torque.

The behavior of the catalytic converter temperature may be measured (via sensors 16 and/or 17) or modeled from operating values of the engine. The modeling of temperatures in the exhaust tract of internal combustion engines is described, for example, in U.S. Pat. No. 5,590,521. With respect to the sensor position in or before a catalytic converter, for BDE systems a position after a primary catalytic converter but before an NOx-storing catalyst may be used. The position of temperature sensors is therefore not limited to the illustrated positions in or before a catalytic converter. Therefore, a position after the catalytic converter is also possible.

Figure 2:
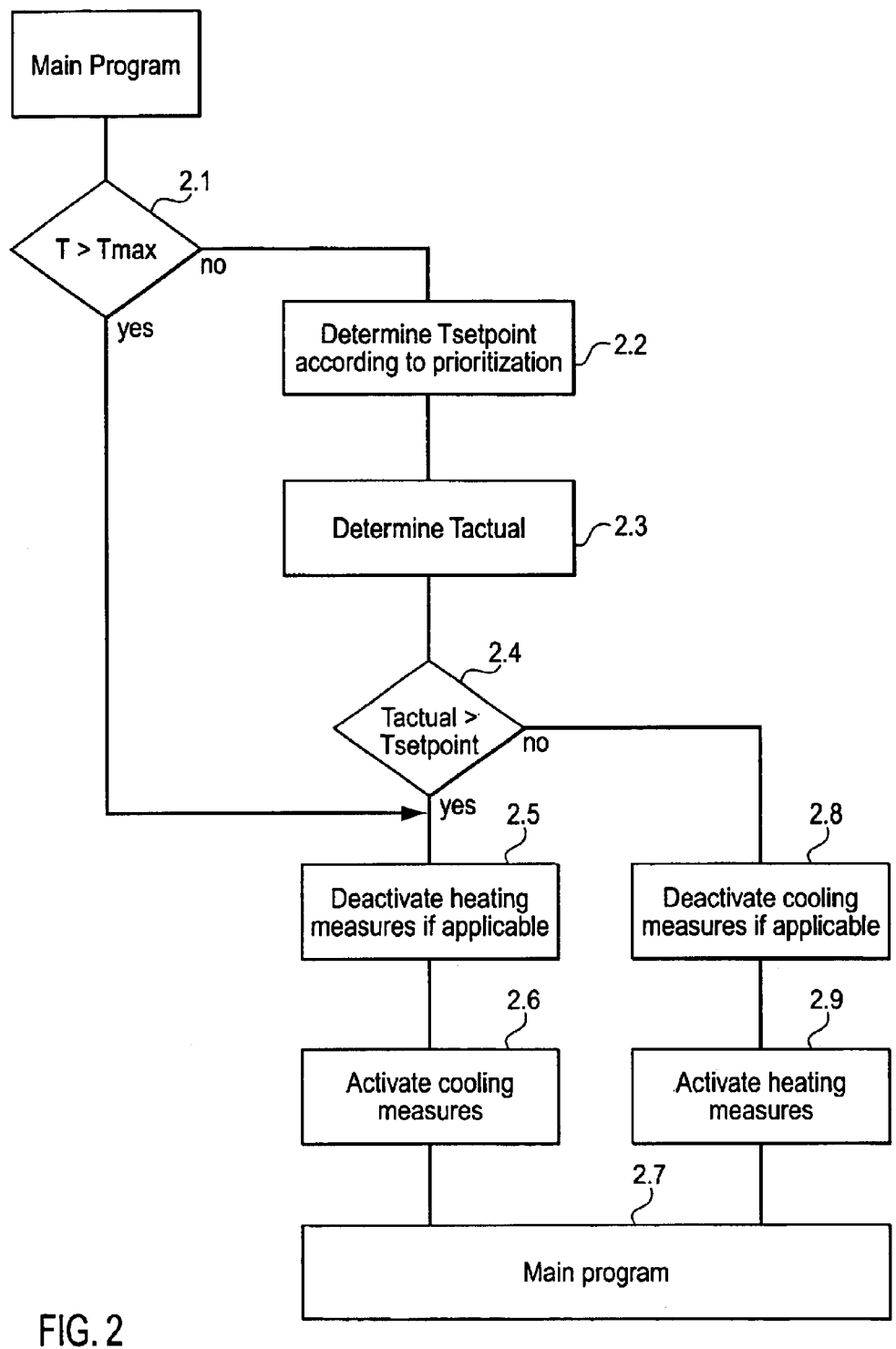
FIG. 2 shows a flow diagram of an exemplary embodiment of the method of the present invention.

FIG. 2 shows a flow diagram of an exemplary embodiment of the method of the present invention. In a step 2.1 which is reached from a superordinate engine control program, a comparison is made of exhaust gas temperature or catalytic converter temperature with a maximum admissible value Tmax. This threshold value comparison is used to protect the component parts from overheating; therefore, according to the example embodiment of the present invention, it has the highest priority. If the exhaust gas temperature or the catalytic converter temperature exceeds the maximum admissible value, then deactivation of possibly activated heating measures and the activation of cooling measures take place in step 2.5. Alternatively to this obligatory activation of cooling measures, it may also be checked after deactivation of the heating measures whether additional cooling measures are required, or whether the deactivation of the heating measures is already sufficient for ensuring the protection of the component parts. In that case, step 2.6 would be skipped and the method would branch back directly to the main program for engine control. From there, after satisfaction of predefined conditions, for instance, after expiration of a waiting time, branching to step 2.1 takes place again. If the query in step 2.1 is answered no, in step 2.2 a determination is made of a temperature setpoint value Tsetpoint according to the prioritization criteria mentioned above. After that, in step 2.3 a determination is made of a temperature actual value Tactual by measuring or by calculation from operating parameters. For the measurement, a separate sensor may be present in the exhaust gas before or after the catalytic converter or in the catalytic converter. However, a temperature value can, for instance, also be obtained from the temperature-dependent internal resistance of exhaust probe 12. Step 2.4 is used for comparison of the setpoint temperature and the actual temperature. If the actual temperature is too high, heating measures are deactivated in step 2.5 inasmuch as any were active, and in step 2.6 one or more cooling measures may follow. Here too, before activation of cooling measures it may be checked whether the deactivation of heating measures was already sufficient for reaching the temperature target. Step 2.7 represents the return to the superordinate engine control program. However, if the actual temperature Tactual exceeds the setpoint temperature Tsetpoint in step 2.4, in step 2.8 cooling measures are possibly deactivated, and in step 2.9 heating measures may be activated, as far as this is required. Activation of the heating measure may be omitted if deactivation of the cooling measure was already sufficient for reaching the temperature setpoint value. In any case, step 2.7 results in a return to the superordinate engine control program.

Using this method, the following sequence occurs, for example, for a temperature requirement for desulfurizing:

If a temperature requirement for desulfurizing has not yet been met, it is achieved by retarded ignition (poor efficiency). In this context, when the temperatures in the exhaust gas system reach critical values, a limitation of these temperatures may become necessary for the protection of the component parts. For this limitation, first of all the point of ignition is moved to the optimum again (improved efficiency). This corresponds to deactivating a heating measure. Only when no active heating measures are in operation (best possible efficiency), active cooling measures are instituted. To the extent it is possible to activate air cooling of the exhaust manifold, this is applied first (or alternatively by diversion of the exhaust gas via an heat exchanger). As a final measure, the air-fuel mixture may be enriched. This ensures that emissions and fuel consumption remain as low as possible.

This procedure presupposes accurate modeling of the exhaust gas temperatures. The best results may be achieved via the direct measurement of exhaust gas temperatures.

What is claimed is:

1. A method for influencing an exhaust gas temperature in an internal combustion engine, the method comprising:
   determining whether an exhaust gas temperature exceeds a preset maximum temperature;
   if it is determined that the exhaust gas temperature does not exceed the maximum temperature then performing the following:
      determining a setpoint temperature according to a prioritization scheme, the prioritization occurring such that a temperature limitation for component protection has a highest priority; and
      determining whether the exhaust gas temperature exceeds the setpoint temperature;
      wherein if the exhaust gas temperature exceeds the setpoint temperature, performing at least one of deactivate heating measures and activate cooling measures, and
      wherein if the exhaust gas temperature does not exceed the setpoint temperature, performing at least one of activate the heating measures and deactivate the cooling measures; and
   if it is determined that the exhaust gas temperature exceeds the maximum temperature, performing at least one of deactivate the heating measures and activate the cooling measures.

2. The method of claim 1, further comprising:
   attributing a higher priority to a temperature requirement for desulfurizing a catalytic converter than a temperature requirement for normal operation of the catalytic converter.

3. The method of claim 1, further comprising:
   retarding ignition as a heating measure, a maximally retarded ignition angle being limited as a function of an operating point of the engine.

4. The method of claim 1, further comprising:
   defining an operating state by at least one of values for air charge, engine speed and engine output.

5. The method of claim 1, further comprising:
   enriching an air/fuel mixture as a function of modeled or measured temperatures in an exhaust gas system as a cooling measure.

6. The method of claim 1, further comprising:
   one of:
      a) measuring at least one of the exhaust gas temperature and a temperature of a catalytic converter; and
      b) modeling at least one of the exhaust gas temperature and the temperature of the catalytic converter from operating values of the engine.

7. The method of claim 1, wherein in the prioritization scheme, temperature requirements for desulfurizing a NOx storing catalyst or for operating in a rich-combustion operating state take precedence over temperature requirements for operating the NOx storing catalyst.

* * * * *